Patented Mar. 18, 1952

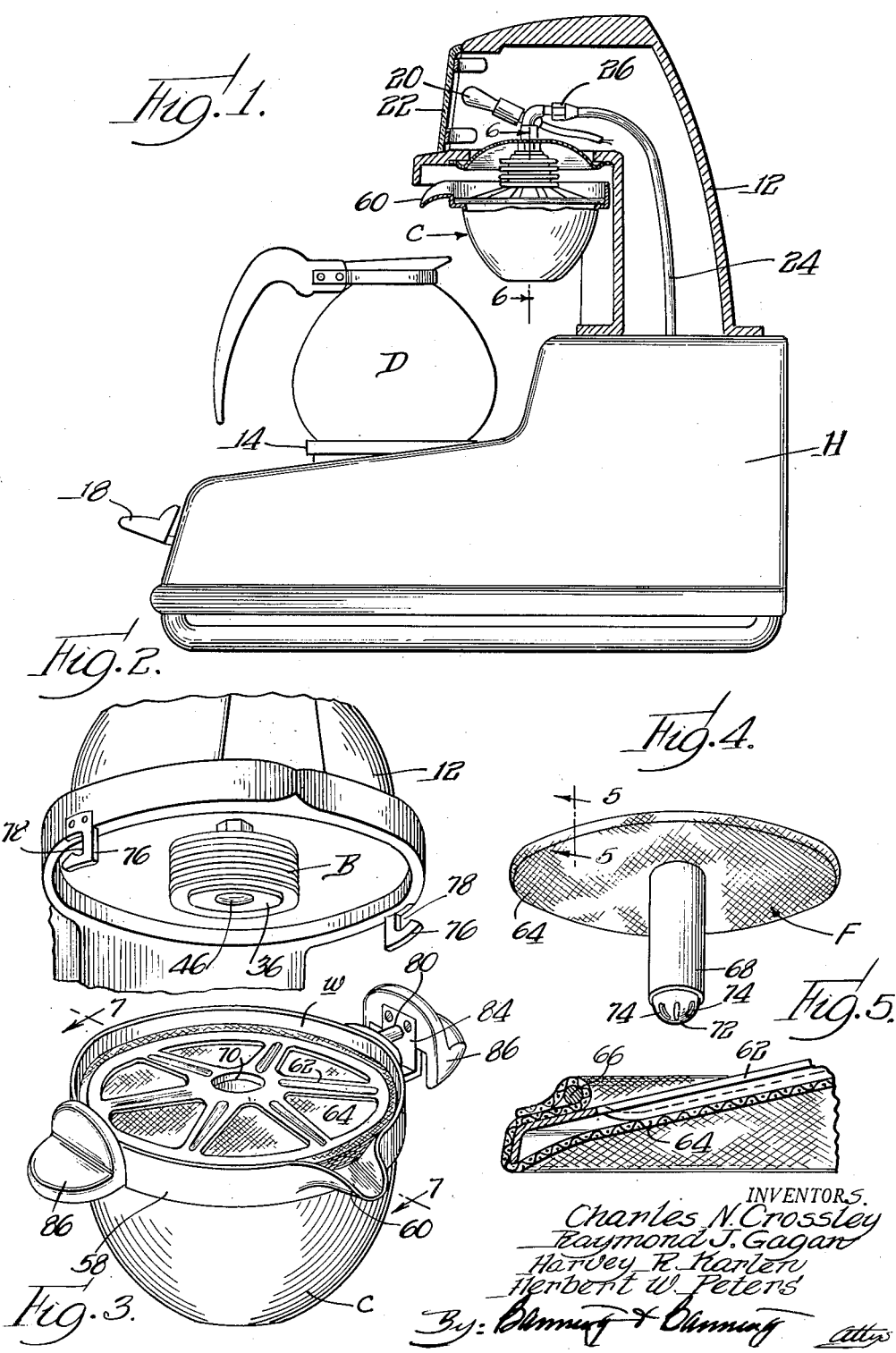

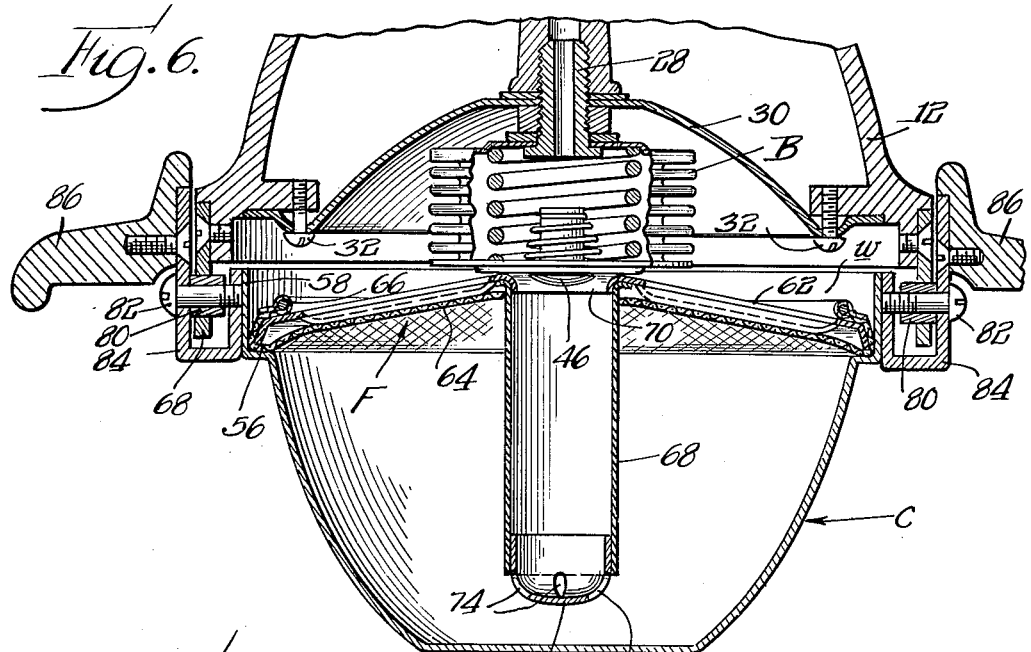
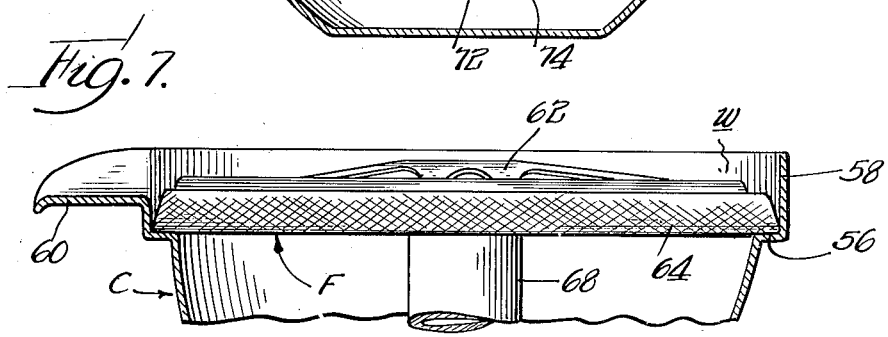
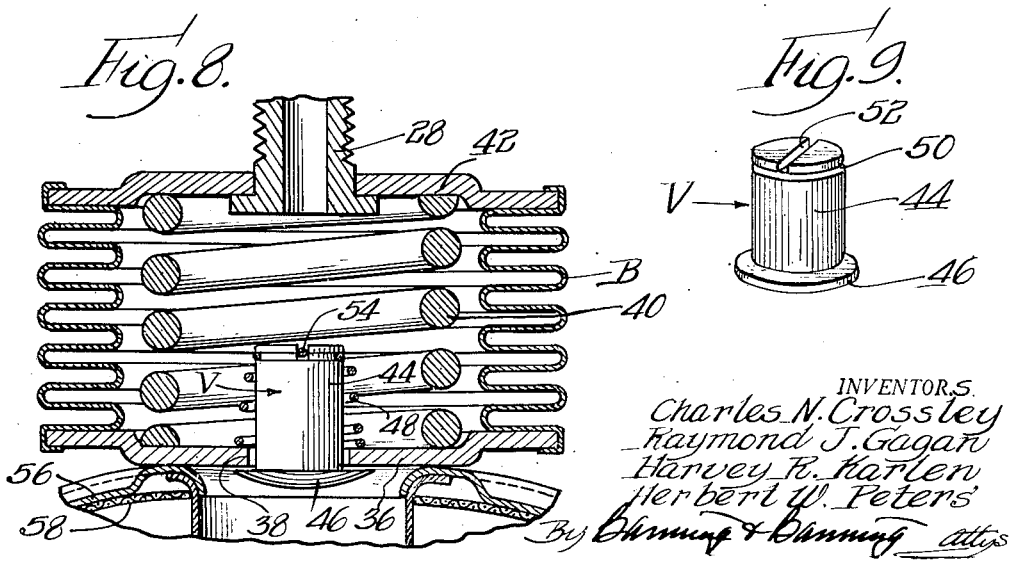
INVENTORS.
Charles N. Crossley
Raymond J. Gagan
Harvey R. Karlen
Herbert W. Peters
By Banning & Banning
Attys

2,589,783

UNITED STATES PATENT OFFICE 2,589,783

BEVERAGE BREWER

Charles N. Crossley, Riverside, Raymond J. Gagan, Oak Park, and Harvey R. Karlen, Chicago, Ill., and Herbert W. Peters, Milwaukee, Wis., assignors to Cory Corporation, Chicago, Ill., a corporation of Delaware Application April 9, 1948, Serial No. 20,134

13 Claims. (Cl. 99—295)

This invention relates to improvements in beverage brewers, and has to do more particularly with commercial coffee brewers designed for use in restaurants and the like where there is a more or less continuous demand for fresh, hot coffee in relatively large amounts.

More especially, the invention pertains to improvements applicable to automatic beverage brewers such as that described in the co-pending application of Herbert W. Peters, Charles N. Crossley, and Raymond J. Gagan, Serial No. 731,324, filed February 27, 1947 which issued as Patent No. 2,551,219, dated May 1, 1951; and our present invention deals specifically with improvements in the coffee cartridge and in the detachable coupling means whereby hot water under pressure is supplied thereto.

One of the objects of the present invention is to improve the cartridge construction in such manner as to insure that the hot water permeating through the mass of ground coffee will in every instance be so directed that it will contact all parts of the mass uniformly. We aim to forestall the possibility of water being diverted along a path of low resistance through the mass which would result in the production of sub-standard coffee and, at the same time, wastage of good coffee bean. To that end our invention includes, as an integral part of the cartridge assembly, a conduit extending downwardly from the hot water inlet port to a point near the bottom of the cartridge where the hot water is discharged through a nozzle to permeate upwardly and uniformly through the mass. By this means we are able to make beverage of constantly uniform strength and in a larger amount from coffee whose quantity is slightly less than heretofore.

Another object of this invention is to improve the cartridge construction in such a way as to prevent escape of coffee solids or grounds through the joint or contact area between the cartridge and the filter unit which forms a removable closure for the cartridge which is in the general form of a bowl. Hydraulic pressure developed inside the cartridge tends to lift the filter unit slightly—enough to allow coffee solids to escape and thus pass with the infusion to the receiving decanter, unless otherwise prevented. We have met such a contingency by providing in the top of the cartridge a cylindrical well in which the filter unit is slidably fitted, like a piston in a pump cylinder, the arrangement being such that even though the internal pressure may be sufficient to lift the filter unit from its seat, there is no resultant opening large enough to enable any coffee solids to escape.

Still another object of our invention is to prevent, or at least minimize, water drippage from the hot water duct at the point where it is detachably coupled to the cartridge assembly. In an automatic coffee brewer of the kind under description a certain amount of drippage has sometimes accompanied removal of the cartridge assembly, and especially when the cartridge assembly has been removed immediately following a coffee-making operation. Such drippage does no actual harm, but requires mopping up, if untidiness is to be avoided, and is objectionable for that reason. We have successfully corrected that condition through the provision of a spring-closed poppet valve immediately at the point of discharge into the cartridge assembly, said valve being effective to prevent outflow of residual water from the duct while at the same time being so loosely seated that it will admit air to the duct.

These and other objects of our invention will be more fully set forth in the following specification taken in conjunction with the accompanying drawings wherein like reference numerals refer to like parts throughout.

In the drawings:

Figure 1 is an end elevation, partly in vertical section, of an automatic beverage brewer incorporating the several improvements of our invention;

Fig. 2 is a perspective view, looking upwardly toward the under face of the head, showing details of construction and illustrating particularly the means whereby the cartridge is detachably held in place;

Fig. 3 is a perspective view of the cartridge, looking downwardly upon the filter unit and showing the construction of the spider frame constituting the rigid part of the filter unit;

Fig. 4 is a perspective view of the filter unit, looking upwardly;

Fig. 5 is an enlarged fragmentary detail in section, taken on line 5—5 of Fig. 4;

Fig. 6 is an enlarged vertical section through the cartridge and the cooperating parts of the head, taken on line 6—6 of Fig. 1;

Fig. 7 is an enlarged fragmentary sectional view, showing the filter unit slidably fitted in a cylindrical well at the top of the coffee cartridge;

Fig. 8 is an enlarged detail, in central vertical section, of the coupling means between the hot water duct and the cartridge, and showing particularly the poppet valve which serves to prevent or minimize drippage; and Fig. 9 is a detail view of the poppet valve per se, shown in perspective.

The present automatic beverage brewer comprises a housing H from which rises a head 12. Within the housing are disposed various parts including a water heater and a controlling mechanism which functions to shut off the water supply automatically. A platform 14 forms a part of the controlling mechanism, and on it is shown a decanter D in position to receive a filling of hot coffee. A control handle 18 projecting from the housing is manually operable to start the flow of hot water which is shut off automatically when the decanter D is filled to a predetermined level. A pilot light 20 situated behind a translucent panel 22 may be connected in circuit through a switch arranged to be closed while the brewing operation is in progress.

A duct 24 extending upwardly from the housing into the head 12 is connected at its lower end to the water heater. The upper end of this duct is connected through a compression coupling 26 and suitable pipe fittings to an externally threaded tubular sleeve 28 (Fig. 6) which is rigidly secured to a dome plate 30 supported by the head 12 to which it is attached as by means of machine screws 32.

Secured to the lower end of the sleeve 28 and concentric therewith is a compressible Sylphon bellows B whose lower end is closed by a disc 36 having an axial opening 38. As shown, a coiled compression spring 40 is disposed interiorly of the bellows 34 to exert opposing thrusts against the lower disc 36 and a second disc 42 which forms the upper closure of the bellows. The function of the spring 40 is primarily to limit the compressive movement of the bellows, and secondarily to add compressive resistance thereto, so that a predetermined force is required to partially collapse the bellows and thus move the bottom disc 36 upwardly from its free position.

A poppet valve V (see Figs. 8 and 9) comprising a cylindrical shank 44 and a mushroom head 46 is supported by the bottom disc 36 through the medium of a coil spring 48. The shank 44 extends through the axial opening 38 in the disc 36, but is of considerably smaller diameter than this opening so that hot water can pass through without excessive restriction. The upper end of the valve shank 44 is grooved circumferentially at 50 to receive the uppermost turn of the spring 48, and is further grooved transversely at 52 to provide a recess in which is seated a diametrical crosspiece 54 forming an integal part of the spring 48. The poppet valve is thus normally held by the spring 48 in its up position with the head 46 substantially abutting the under face of the disc 36. When hot water is permitted to flow through the duct 24, it will pass through the sleeve 28 into the bellows B, and out through its bottom opening 38, the valve V then being opened by the water pressure.

A cartridge C is located below and in axial alignment with the bellows B. This cartridge is adapted to hold a charge of beverage-making material such as ground coffee through which the stream of hot water permeates on its way to the decanter D. The resulting infusion is, of course, hot coffee or other beverage, depending upon the beverage making material employed.

The cartridge C comprises a bowl-like receptacle made preferably of stainless steel, and proportioned to receive and hold a suitable quantity of water-pervious beverage-making material such as finely ground coffee. The upper margin of the cartridge is outset to provide a cylindrical well $w$ defined bottomwise by a ledge 56 surrounded by an upstanding marginal wall 58 which at one point above the bottom of the well is broken to connect with a horizontally extending discharge spout 60 (see Fig. 7).

A filter unit F which serves as a removable closure for the cartridge C is supported on the ledge 56 and centered within the surrounding wall 58. This filter unit comprises a dished spider 62 of stainless steel or the like (see Fig. 3) to the under side of which is fitted a filter cloth 64 which is cut and shaped properly for this purpose. The peripheral margin of the filter cloth is adapted to extend around and over the periphery of the spider 62 to be anchored in place by any suitable means such as a draw string 66 (see Fig. 5).

Depending axially from the spider is a tubular conduit in communication with a central opening 70 in the spider. The conduit extends downwardly to a point close to the bottom of the cartridge C. A cup-shaped nozzle 72 secured at the lower end of the conduit 68 is provided with plural openings 74 so distributed that hot water will be discharged therefrom into the cartridge C in substantially all directions horizontally as well as downwardly, thus insuring that the hot water will enter into the cartridge at a bottom point which is adjacent the bottom of the mass of ground coffee charge in the cartridge. The hot water then spreads laterally to float the coffee charge upwardly against the under side of the filter unit, and in so doing it rises through the charge vertically permeating the entire mass of the coffee uniformly and effectively. This up movement of the hot water involves no disturbance or agitation of the coffee mass, and furthermore leeches the coffee grounds with water which is fresh at all stages of the operation. The carbon dioxide released from the finely divided coffee forms bubbles which cling to the coffee particles, thus providing a filter bed internally of the coffee mass to prevent the passage of any finer particles which may have become freed and so tend to be carried upwardly through the mass with the moving hot water.

The cartridge, including its filter unit F at the top, is removably secured to a pair of trunnion plates 76 which are suspended from the housing head 12 at diametrically opposite points. Each trunnion plate is formed with a bayonet notch 78 adapted to receive one of a pair of trunnions each consisting of a tubular roller 80 mounted on a machine screw 82 which is carried by and threaded into a U-shaped bracket 84. These brackets are located at diametrically opposite sides of the cartridge C in quadrature to its spout 60, and each bracket has one leg welded or otherwise secured to the top marginal wall 58 of the cartridge. A grip 86 is secured to the outer leg of each U-shaped bracket 84, and the two grips may be seized for lifting and rotating the cartridge when the same is being mounted in operating position, and thereafter when being removed for cleaning and refilling.

Initially the rollers 80 are brought to position with respect to the trunnion plates 76, opposite the open ends of the notches 78, and the cartridge is then rotated until the rollers are fully engaged in the notches. In reaching this position the top center of the spider 62 engages the bottom disc 36 (see Fig. 8) to compress the bellows B against the tension of its coil spring 40, thereby establishing a water-tight joint between the bellows and the intake end of the conduit 68. This condition continues so long as the cartridge remains in place.

Assuming the cartridge C to be filled with fresh ground coffee and mounted on the head 12, operation of the brewer is started by merely placing an empty decanter D on the platform 14 and manually operating the control handle 18. Hot water is then permitted to flow through the duct 24 and thence through the bellows B and the opening 38 into the conduit 68, the valve V being forced to an open position by hydraulic pressure. The hot water emerging through the nozzle openings 74 then starts flowing outwardly, entering the ground coffee mass at the bottom and passing upwardly out of the cartridge through the filter F to flow via the spout 60 into the decanter D. When the decanter is filled to a predetermined level, its weight is sufficient to trip the controlling mechanism, thereby shutting off the further flow of hot water.

It is, of course, necessary that with each operation the cartridge be removed, cleaned, and refilled, and one of the novel features of this invention resides in the provision of means for preventing or minimizing drippage from the bellows B when such removal takes place. The poppet valve V is then relied upon to stop any such dripping. With removal of the cartridge, the hydraulic pressure is relieved by stoppage of the flow of hot water, and the valve V will then close sufficiently to prevent outflow of any residual water or condensation within the bellows B. The valve surfaces may be left rough so that they will not form an air-tight seal but will provide an air vent to prevent the formation of a partial vacuum within the bellows. As another alternative, a small air vent hole may be drilled axially through the valve V to admit air to the bellows, and in that case the valve may be designed to seat tightly, if desired.

With the cartridge construction heretofore employed it sometimes happens that the filter unit at the top is lifted off its seat by hydraulic pressure, and as a result coffee grounds will leak out and pass in with the coffee infusion into the decanter D. Such a condition which is manifestly objectionable has been overcome in the structure of the present invention by providing the cartridge C with the outset well $w$ in which the filter unit F is slidably fitted. With this arrangement coffee grounds cannot escape from the cartridge as a result of the filter unit F being forced up, because the closeness of its fit within the well is unaffected. It will be observed that the spout 60 is located well above the bottom of the well which is defined by the ledge 56, and for this reason it would require a very considerable upward movement of the filter unit F to open up a passageway for any coffee grounds to escape directly into the spout. Such an extensive movement of the filter unit cannot occur in the present construction because means is provided in connection with the bellows B to limit its compressive movement to a distance which is less than that required for lifting of the filter unit to the level of the spout 60.

The incoming hot water is here required to follow a predetermined course through the mass of ground coffee to produce a uniform extraction of the coffee essence. This is due to the discharge of the water into the mass of ground coffee near the bottom thereof, through the medium of the nozzle openings 74 which create streams proceeding horizontally in all directions and then upwardly so that the mass is uniformly permeated. This, we find, results in a complete and uniform extraction, and consequently a considerably increased volume of good coffee infusion per cartridge filling.

It is obvious that various changes may be made in the specific embodiments set forth for purposes of illustration without departing from the principles of the invention. The invention is accordingly not to be limited to the precise details disclosed herein but includes all modifications thereof within the spirit and scope of the appended claims.

We claim:

1. A beverage brewer including a depending hot water duct having a discharge port at the lower end, a valve movable upwardly and downwardly normally closing said port and operative to open downwardly in response to direct hydraulic pressure within said duct to permit water to discharge therefrom, an open-top cartridge located directly beneath the hot water duct and adapted to hold a quantity of beverage-making ingredient, a filter unit forming a removable closure for the cartridge top, said filter unit having an intake port, and means for removably holding said cartridge in position to receive water from said duct with said discharge and intake ports in register, said valve being effective to reduce drippage from said discharge port when the flow of water through said duct is shut off consequent upon removal of the cartridge.

2. A beverage brewer including a refillable cartridge for a beverage-making ingredient, said cartridge having at its top an outset cylindrical wall defining a well whose bottom is an annular ledge, said cartridge also including a discharge spout entering said well at a point substantially above said ledge, a filter unit forming a closure for said cartridge and normally resting on said ledge, said filter unit slidably fitting said cylindrical wall with a peripheral clearance so small that comminuted material such as coffee grounds cannot escape from said cartridge in substantial quantity through said clearance, said filter unit having an axial intake opening, a Sylphon bellows disposed above said filter unit, a hot water duct leading into said bellows at the upper end thereof, said bellows having a discharge port at its lower end in registration with said intake opening, a spring-biased valve member normally closing said discharge port, said valve member being movable to open said discharge port in response to hydraulic pressure within said bellows, and a coil spring within said bellows and operative yieldably to reinforce said bellows against axiswise compression and to press the lower end of said bellows against said filter unit.

3. A beverage brewer including a depending hot water duct provided at the bottom with a vertical Sylphon bellows and having a discharge port in the lower end of the bellows, an open-top cartridge located directly beneath the discharge port of the bellows and adapted to hold a quantity of beverage-making ingredient, said cartridge having at its top an outset cylindrical wall defining a well whose bottom is an annular ledge, a filter unit forming a closure for said cartridge and slidably fitting said cylindrical wall, said filter unit having an axial intake opening in register with the discharge port of the Sylphon bellows and being slidable vertically along the cylindrical wall of the well, and a conduit suspended from said filter unit and extending downwardly therefrom to a point near the cartridge bottom, and discharging into the base of the beverage-making ingredient to float the same and exert a thrust force against the filter unit tending to slide it upwardly into pressure engagement with the Sylphon bellows at the discharge port thereof, and a spring-biased valve member normally closing said discharge port, said valve member being movable by hydraulic pressure within said bellows to open said port and operative when the water supply is cut off to close said port and thereby reduce drippage from said port.

4. A beverage brewer including a hot water supply duct, a Sylphon bellows connected at one end with said duct and having a discharge port in the other end, an open-top cartridge located directly beneath the discharge port of the bellows and adapted to hold a quantity of beverage-making ingredient, said cartridge having at its top an outset cylindrical wall defining a well whose bottom is an annular ledge, a filter unit forming a closure for said cartridge and slidably fitting said cylindrical wall, said filter unit having an axial intake opening in register with the discharge port of the Sylphon bellows and being slidable vertically along the cylindrical wall of the well, and a conduit suspended from said filter unit and extending downwardly therefrom to a point near the cartridge bottom, and discharging into the base of the beverage-making ingredient to float the same and exert a thrust force against the filter unit tending to slide it upwardly into pressure engagement with the Sylphon bellows at the discharge port thereof, and a spring-biased valve member normally closing said discharge port, said valve member being movable by hydraulic pressure within said bellows to open said port and operative when the water supply is cut off to close said port and thereby reduce drippage from said port.

5. A beverage brewer including a depending hot water duct provided at the bottom with a vertical Sylphon bellows and having a discharge port in the lower end of the bellows, an open-top cartridge located directly beneath the discharge port of the bellows and adapted to hold a quantity of beverage-making ingredient, said cartridge having at its top an outset cylindrical wall defining a well whose bottom is an annular ledge, a filter unit forming a closure for said cartridge and slidably fitting said cylindrical wall, said filter unit having an axial intake opening in register with the discharge port of the Sylphon bellows and being slidable vertically along the cylindrical wall of the well, and a conduit suspended from said filter unit and extending downwardly therefrom to a point near the cartridge bottom, and discharging into the base of the beverage-making ingredient to float the same and exert a thrust force against the filter unit tending to slide it upwardly into pressure engagement with the Sylphon bellows at the discharge port thereof, a poppet valve having a shank extending through said discharge port and a head of larger diameter than said port located beneath the same exteriorly of the bellows, said valve being movable upwardly to close said port, and a spring biasing said valve so that said head normally closes said port against outflow of residual water when the water supply is shut off and said valve being movable by direct hydraulic pressure from within said bellows to open said port.

6. The combination according to claim 5, characterized in that said valve is seated so imperfectly as to provide an air vent that air can leak therethrough into said bellows when the water supply is shut off, thereby preventing the formation of a partial vacuum within the bellows.

7. A beverage brewer including a depending hot water duct provided at the bottom with a vertical Sylphon bellows and having a discharge port in the lower end of the bellows, an open-top cartridge located directly beneath the discharge port of the bellows and adapted to hold a quantity of beverage-making ingredient, said cartridge having at its top an outset cylindrical wall defining a well whose bottom is an annular ledge, a filter unit forming a closure for said cartridge and slidably fitting said cylindrical wall, said filter unit having an axial intake opening in register with the discharge port of the Sylphon bellows and being slidable vertically along the cylindrical wall of the well, and a conduit suspended from said filter unit and extending downwardly therefrom to a point near the cartridge bottom, and discharging into the base of the beverage-making ingredient to float the same and exert a thrust force against the filter unit tending to slide it upwardly into pressure engagement with the Sylphon bellows at the discharge port thereof, a poppet valve having a shank extending through said discharge port and a head of larger diameter than said port located beneath the same exteriorly of the bellows, said valve being movable upwardly to close said port, a spring biasing said valve so that said head normally closes said port against outflow of residual water when the water supply is shut off and said valve being movable by direct hydraulic pressure from within said bellows to open said port, and a coil spring within said bellows and operative yieldably to reinforce said bellows against axiswise compression.

8. A beverage brewer including a depending hot water duct provided at the bottom with a vertical Sylphon bellows and having a discharge port in the lower end of the bellows, a spring-biased valve normally closing said port and movable downwardly in response to direct hydraulic pressure within the bellows to open said port, resilient means in connection with said bellows operative yieldably to limit the axiswise compression of said bellows, and open-top cartridge located directly beneath the discharge port of the bellows and adapted to hold a quantity of beverage-making ingredient, said cartridge having at its top an outset cylindrical wall defining a well whose bottom is an annular ledge, a filter unit forming a closure for said cartridge and slidably fitting said cylindrical wall, said filter unit having an axial intake opening in register with the discharge port of the Sylphon bellows and being slidable vertically along the cylindrical wall of the well, and a conduit suspended from said filter unit and extending downwardly therefrom to a point near the cartridge bottom, and discharging into the base of the beverage-making ingredient to float the same and exert a thrust force against the filter unit tending to slide it upwardly into pressure engagement with the Sylphon bellows at the discharge port thereof.

9. In a beverage brewer, a refillable cartridge for a beverage-making ingredient, said cartridge having at its top an outset cylindrical wall defining a well whose bottom is an annular ledge, said cartridge also including a discharge spout entering said well at a point substantially above said ledge, a filter unit forming a closure for said cartridge and normally resting on said ledge, said filter unit slidably fitting said cylindrical wall with a peripheral clearance so small that comminuted material such as coffee grounds cannot escape from said cartridge in substantial quantity through said clearance, said filter unit having an axial intake opening, a Sylphon bellows disposed above said filter unit, a hot water duct leading into said bellows at the upper end thereof, said bellows having a discharge port at its lower end in registration with said intake opening, a spring-biased valve member normally closing said discharge port, said valve member being movable to open said discharge port in response to hydraulic pressure within said bellows, and resilient means in connection with said bellows and operative yieldably to limit the axiswise compression of said bellows and to press the lower end of said bellows against said filter unit.

10. In a beverage brewer, a refillable cartridge for a beverage-making ingredient, said cartridge having at its top an outset cylindrical wall defining a well whose bottom is an annular ledge, said cartridge also including a discharge spout entering said well at a point substantially above said ledge, a filter unit forming a closure for said cartridge and normally resting on said ledge, said filter unit slidably fitting said cylindrical wall with a peripheral clearance so small that comminuted material such as coffee grounds cannot escape from said cartridge in substantial quantity through said clearance, said filter unit having an axial intake opening, a Sylphon bellows disposed above said filter unit, a hot water duct leading into said bellows at the upper end thereof, said bellows having a discharge port at its lower end in registration with said intake opening, a spring-biased valve member normally closing said discharge port, said valve member being movable to open said discharge port in response to hydraulic pressure within said bellows, and a coil spring within said bellows and operative yieldably to reinforce said bellows against axiswise compression and to press the lower end of said bellows against said filter unit.

11. In a beverage brewer, a detachable refillable cartridge comprising a bowl-like receptacle closed at the bottom and sides and adapted to receive a charge of beverage-making ingredient and having adjacent its top a cylindrical wall and below its top means extending inwardly of the cartridge to provide a stop means, a discharge spout connected with the cartridge and entering through the cylindrical wall thereof at a point medially of its top edge and the stop means therebelow, a filter unit forming a closure for the cartridge and provided with an inlet opening and normally resting on the stop means, the filter unit slidably fitting the cylindrical wall for vertical movement, a conduit suspended from said filter unit and extending downwardly therefrom to a point near the cartridge bottom and connected at its upper end with the inlet opening and discharging at its lower end at the base of the charge of beverage-making ingredient to cause the hot water to float the charge of beverage-making ingredient and exert a thrust force against the filter unit tending to slide it upwardly along said cylindrical wall, means providing a chamber having a bottom opening opposite the inlet opening of the filter unit, a hot water duct leading to said chamber, a spring biased valve member normally closing the bottom opening of the chamber, the valve member being movable downwardly to open the discharge port of the chamber in response to direct hydraulic pressure therewithin, and spring means acting against the chamber and operative to press the lower end thereof tightly against the filter unit in sealing engagement therewith with capacity to yield when the filter unit is moved upwardly by the hot water and the charge of beverage-making ingredient.

12. In a beverage brewer, a detachable refillable cartridge comprising a bowl-like receptacle closed at the bottom and sides and adapted to receive a charge of beverage-making ingredient and having adjacent its top a cylindrical wall and below its top means extending inwardly of the cartridge to provide a stop means, a discharge spout connected with the cartridge and entering through the cylindrical wall thereof at a point medially of its top edge and the stop means therebelow, a filter unit forming a closure for the cartridge and provided with an inlet opening and normally resting on the stop means, the filter unit slidably fitting the cylindrical wall for vertical movement, a conduit suspended from said filter unit and extending downwardly therefrom to a point near the cartridge bottom and connected at its upper end with the inlet opening and discharging hot water at its lower end at the base of the charge of beverage-making ingredient to float the charge of beverage-making ingredient and exert a thrust force against the filter unit tending to slide it upwardly along said cylindrical wall, Sylphon bellows providing a chamber having a bottom opening opposite the inlet opening of the filter unit, a hot water duct leading to said chamber, and spring means acting against the chamber and operative to press the lower end thereof tightly against the filter unit in sealing engagement therewith with capacity to yield when the filter unit is moved upwardly by the hot water and the charge of beverage-making ingredient.

13. In a beverage brewer, a detachable refillable cartridge comprising a bowl-like receptacle closed at the bottom and sides and adapted to receive a charge of beverage-making ingredient and having adjacent its top a cylindrical wall and below its top means extending inwardly of the cartridge to provide a stop means, a discharge spout connected with the cartridge and entering through the cylindrical wall thereof at a point medially of its top edge and the stop means therebelow, a filter unit forming a closure for the cartridge and provided with an inlet opening and normally resting on the stop means, the filter unit slidably fitting the cylindrical wall for vertical movement, a conduit suspended from said filter unit and extending downwardly therefrom to a point near the cartridge bottom and connected at its upper end with the inlet opening, a nozzle having a cylindrical portion telescoping the lower end of the conduit and provided with a substantially cup-shaped lower portion protruding from the lower end of the conduit and provided with slots extending downwardly and inwardly from the lower end of the conduit and arranged to discharge hot water into the charge of beverage-making ingredient at the base thereof to cause the hot water to float the charge of beverage-making ingredient and exert a thrust force against the filter unit tending to slide it upwardly along said cylindrical wall, Sylphon bellows providing a chamber having a bottom opening opposite the inlet opening of the filter unit, a hot water duct leading to said chamber, and spring means acting against the chamber and operative to press the lower end thereof tightly against the filter unit in sealing engagement therewith with capacity to yield when the filter unit is moved upwardly by the hot water and the charge of beverage-making ingredient.

CHARLES N. CROSSLEY.
    RAYMOND J. GAGAN.
    HARVEY R. KARLEN.
    HERBERT W. PETERS.

REFERENCES CITED

The following references are of record in the file of this patent:

UNITED STATES PATENTS

| Number | Name | Date |
|---|---|---|
| Re. 22,022 | Peters | Feb. 10, 1942 |
| Re. 22,879 | Peters et al. | May 13, 1947 |
| 95,959 | Warner | Oct. 19, 1869 |
| 236,792 | Etzensberger | Jan. 18, 1881 |
| 642,119 | Heysinger | Jan. 30, 1900 |
| 992,021 | Marzetti | May 9, 1911 |
| 1,696,313 | Liddell | Dec. 25, 1928 |
| 1,800,463 | Meinken | Apr. 14, 1931 |
| 1,955,029 | Smallhouse | Apr. 17, 1934 |
| 2,041,735 | Young | May 26, 1936 |
| 2,087,258 | Lateur | July 20, 1937 |
| 2,301,031 | Ferguson | Nov. 3, 1942 |
| 2,313,149 | Jacobsson | Mar. 9, 1943 |
| 2,333,401 | Woods | Nov. 2, 1943 |
| 2,382,594 | Wolcott | Aug. 14, 1945 |
| 2,449,620 | Reichold | Sept. 21, 1948 |
| 2,469,038 | Winkler | May 3, 1949 |
| 2,475,894 | Hermanny | July 12, 1949 |
| 2,484,054 | Sharp | Oct. 11, 1949 |

FOREIGN PATENTS

| Number | Country | Date |
|---|---|---|
| 6,989 | Great Britain | of 1914 |
| 469,421 | France | May 20, 1914 |